June 24, 1941.   E. J. ROTH   2,246,758
EXTRUSION DEVICE
Filed Dec. 6, 1940   9 Sheets-Sheet 1

INVENTOR
Ernest J. Roth
BY
Charles A. Morton
ATTORNEY

June 24, 1941.  E. J. ROTH  2,246,758

EXTRUSION DEVICE

Filed Dec. 6, 1940  9 Sheets-Sheet 6

INVENTOR
Ernest J. Roth
BY
Charles A. Morton
ATTORNEY

June 24, 1941.  E. J. ROTH  2,246,758

EXTRUSION DEVICE

Filed Dec. 6, 1940  9 Sheets-Sheet 7

INVENTOR
Ernest J. Roth
BY
Charles A. Morton.
ATTORNEY

June 24, 1941.　　　E. J. ROTH　　　2,246,758
EXTRUSION DEVICE
Filed Dec. 6, 1940　　　9 Sheets-Sheet 8

INVENTOR
*Ernest J. Roth*
BY
*Charles A. Morton*
ATTORNEY

Patented June 24, 1941

2,246,758

UNITED STATES PATENT OFFICE 2,246,758

EXTRUSION DEVICE

Ernest J. Roth, Norwood, N. J., assignor to Joe Lowe Corporation, New York, N. Y., a corporation of Delaware Application December 6, 1940, Serial No. 368,797

26 Claims. (Cl. 107—14)

This invention relates to improvements in extrusion machines, and more particularly in extrusion machines of the die expressing type. It is particularly applicable for use in the extrusion of plastic formations of edible products such as raw doughnuts made from batter. This application is a continuation in part of my former application Serial Number 293,185, filed September 2, 1939.

The principal object of this invention is to reduce agitation of the plastic material during its passage through the extrusion machine to a minimum, thus quite substantially reducing "working" of the plastic material so as to avoid toughening of the finished product.

Another object is to insure uniformity of size of the extrusions.

Another object is an extrusion machine which is positive in operation.

Another object is an extrusion machine which is easy to regulate to effect a positive instantaneous and accurate variation in the size of the extrusions.

Another object is a simple compact extrusion machine which can be quickly disassembled to facilitate cleaning, readily cleaned, and thereafter rapidly re-assembled for further use.

Another object is an extrusion machine of rugged construction with but few and simple parts.

Another object is the substantial elimination of wastage of the plastic material.

Another object is an extrusion machine which can be reloaded without stopping the machine.

Other objects will appear from the detailed description which follows.

In accordance with this invention the plastic material is deposited in a hopper open to atmosphere at the top, said hopper having an intermittently valved connection with an intermittently vented extrusion outlet, and with both the extrusion outlet and the valve closed the pressure below the valve is rapidly reduced to a pressure below atmosphere whereupon said valve is opened to force a portion of plastic material through the open valve; said valve being then closed to cut off communication with the hopper and the pressure below said valve is rapidly built up to a pressure substantially above atmosphere whereupon the extrusion outlet is opened to express some of the plastic material through said extrusion outlet. The size of the extrusion may be controlled in a very positive manner regardless of the viscosity of the plastic by regulating the internal air pressure of the extrusion device.

In the drawings comprising nine sheets of nineteen figures numbered Figs. 1 to 19 inclusive.

Like reference characters designate corresponding parts throughout the several figures of the drawings.

The hopper 3 for holding the dough or other plastic material is demountably mounted in the upper open end of a casing forming a hopper base 1. The lower end of the base 1 is open to form a valve port 29 the walls whereof may be suitably channelled to guide the movement of a valve in this instance a sliding valve 4 fashioned in the form of a knife blade. Surrounding the hopper base is an outer chamber forming an air jacket 30 having a suitable outlet 31 detachably connectable to a combined vacuum and pressure system (Fig. 2).

Hopper base 1 is demountably mountable upon lateral flanges forming the upper face of a lower casing 32, the hopper base and casing 32 being locked together in any preferred manner as by a series of knurl headed bolts 33, the whole being supported by the brackets 5. Lower casing 32 includes a chamber 2 for holding a quantity of dough or other plastic, and the lower end of casing 32, terminates in one or more extrusion outlets 34—34 which may be male threaded to receive the female threaded flared collars 63—63 of the tubular extrusion nozzles 16—16.

Figure 17:
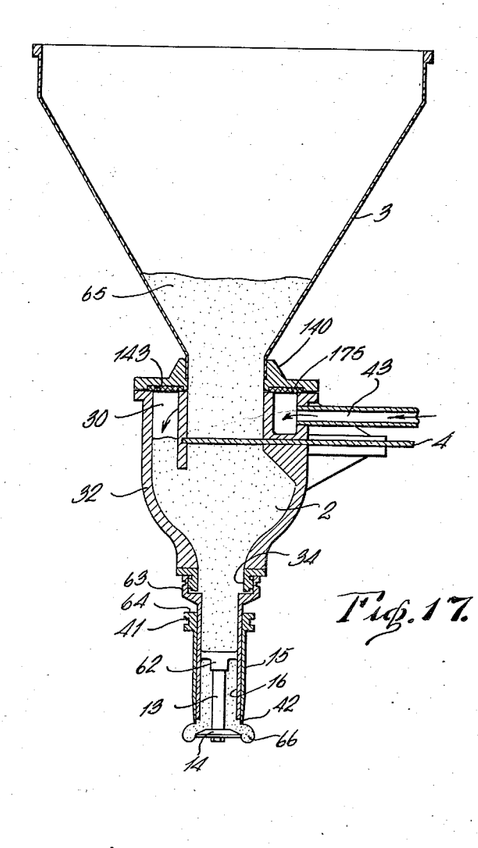

A forming die for forming plastic formations of any desired shape may be demountably mounted upon each extrusion nozzle 16. For imparting an annular formation to the extruded plastic, a disc 14 may be screwed upon the lower end of a stem 13 whose upper end is screw threaded to a spider which in turn is either detachably secured to, or cast as an integral part of, the interior wall of the nozzle 16. Cutter sleeve 15 which has an annular bevelled knife edge 42 is mounted upon the nozzle 16 for axial sliding movement relative thereto, the opening in the cutter sleeve 15 being so proportioned as to permit the bevelled knife edge 42 of the cutter sleeve 15 to slide downwards over the bevelled edge of disc 14 thereby closing the extrusion outlet and severing the plastic material 66 (Fig. 17) surrounding disc 14 and forming an annulus of plastic material as for example a ring doughnut. The forming die unit consisting of nozzle 16, disc 14, and cutter sleeve 15, may be replaced by any other well known type of forming die to produce other formations, such for example, as stick doughnuts. For this purpose the nozzles of the extrusion outlets 34 are male threaded, to receive the female threaded collar 63 of the extrusion nozzles 16.

Figure 1:
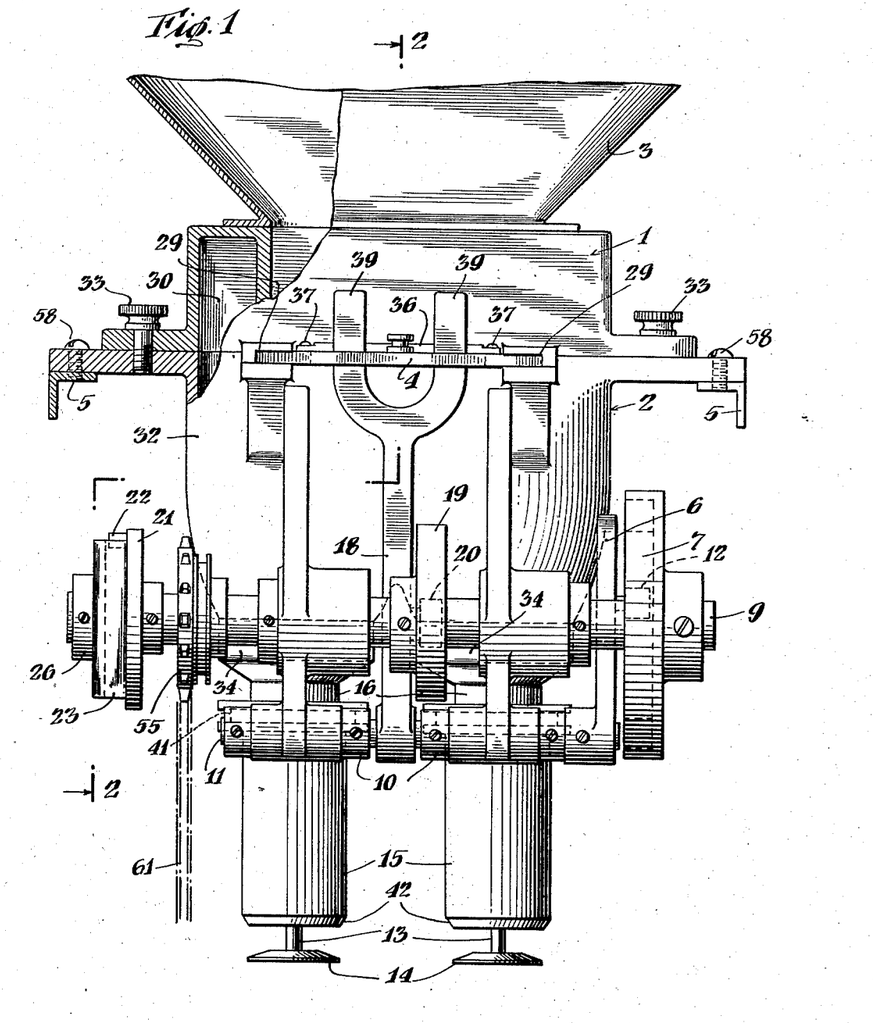
Fig. 1 is a rear view of the extrusion machine.
Figure 2:
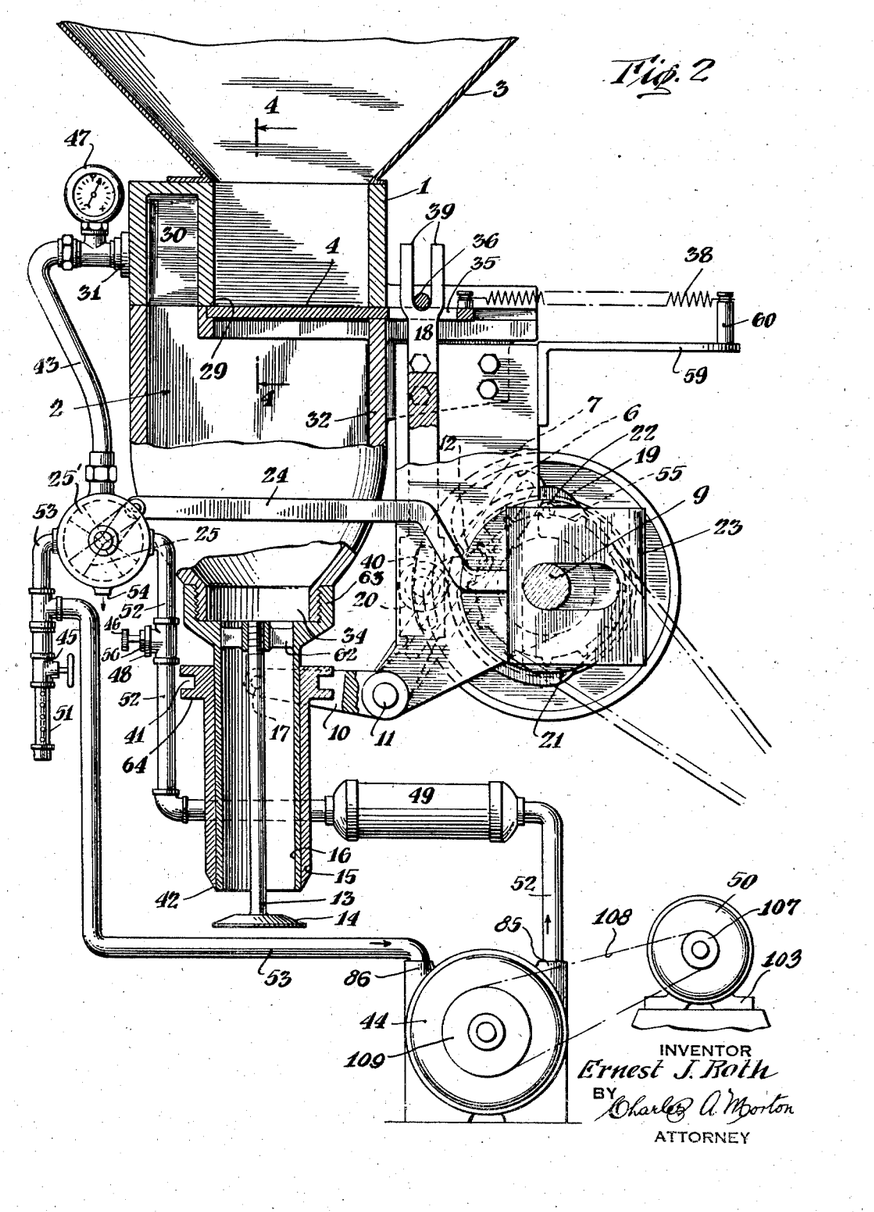
Fig. 2 is a side view with certain of the parts shown in vertical cross section along the line 2—2 of Fig. 1, looking in the direction of the arrows.
Figure 3:
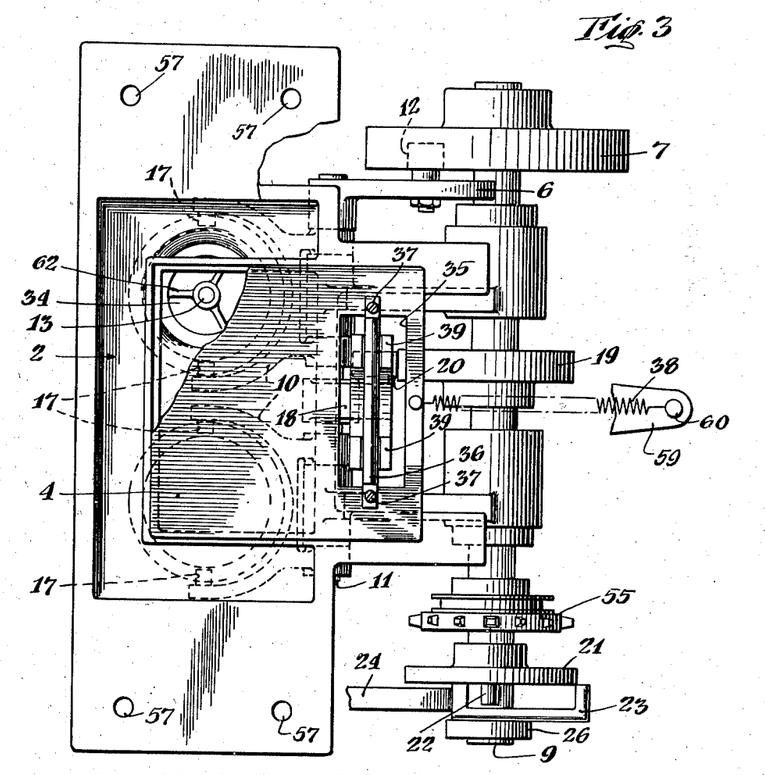
Fig. 3 is a top view of the lower part of the extrusion machine with the hopper base removed.
Figure 4:
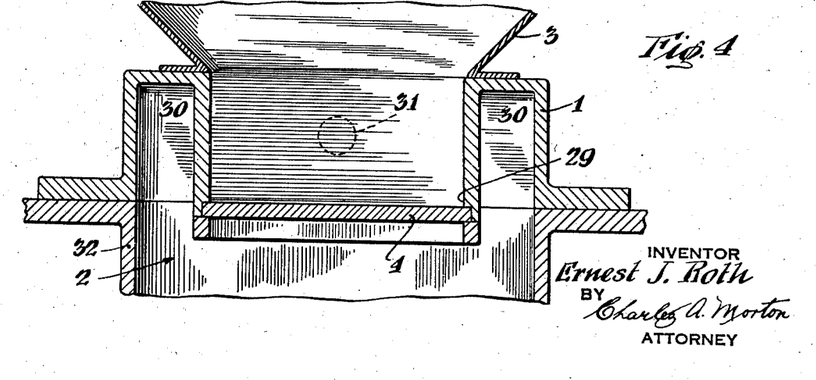
Fig. 4 is a vertical cross section taken along the line 4—4 of Fig. 2, looking in the direction of the arrows.

The valve 4 may be provided with an opening 35, and an actuating pin 36 may be mounted across the opening 35 in any suitable manner as by means of screws 37 (see Figs. 2 and 3). Valve 4 may be oscillated in any suitable manner as by a bifurcated lever 18 having bifurcated fingers 39—39 for engaging actuating pin 36. Bifurcated lever 18 may be actuated in any suitable way as by a cam 19 mounted upon main drive shaft 9. Cam 19 may operate lever 18 through a cam follower 20 against increased tension of a retractile spring 38 which is anchored at one end to a lug formed on valve 4 and at the other end to a lug 60 on extension arm 59, the retractile spring in de-energizing moving valve 4 to its alternate position as the cam pressure is removed. The extent of open movement of the valve 4 may be regulated in any suitable manner as by varying the position of the cam follower 20 in curved slot 40 of lever 18 (Fig. 2). Other forms of cam mechanism such as a box cam and cam follower may be used to operate bifurcated lever 18 and valve 4, and other forms of valve may be substituted for the slide valve 4.

Cutter sleeve 15 may be actuated in any preferred manner as by a lever 6 and sleeve fork 10 mounted upon a common shaft 11, the lever 6 being operated by a cam follower 12 positioned in a box cam 7. The shape of the box cam 7 is such as to cause cam follower 12 to swing lever 6 so as to raise and lower the fork 10 carrying lifting pins 17 which engage the annular channel(s) 41 of the annular shoulder 64 of the cutter sleeve(s) 15, thereby sliding cutter sleeve(s) 15 axially relative to extrusion nozzle(s) 16 to reciprocate bevelled knife edge 42 of cutter sleeve 15 to and fro across the bevelled peripheral edge of disc 14.

Air jacket 30 is connected by means of an outlet 31, compound vacuum and pressure gauge indicator 47, pipe line 43, and trip valve 25 with a pump 44 driven by any source of energy such as an electric motor 50. The trip valve 25 is cyclicly operable from position 25 to position 25′ (Fig. 2), to alternately connect pipe line 53 leading to the intake or suction side of the pump to pipe line 43 while connecting pipe line 52 leading to the compression side of the pump to atmosphere at exhaust port 54 (position 25); and then connecting pipe line 53 to atmosphere through exhaust port 54 while connecting compressed air pipe line 52 to pipe line 43 and air jacket 30 (position 25′). By this cycle of operations air jacket 30 is alternately connected to the intake or suction side of pump 44 and then to the delivery or compression side of the pump as the trip valve oscillates between position 25 and position 25′ (Fig. 2) under control of connecting rod 24, to vary the pressure in air jacket 30 from below to substantially above, atmosphere. The trip valve 25 may be operated in any preferred manner as by means of connecting rod 24, oscillated by means of a slide 23, a pin 22, and a rotating disc 21 which is mounted upon main drive shaft 9.

Figure 16:
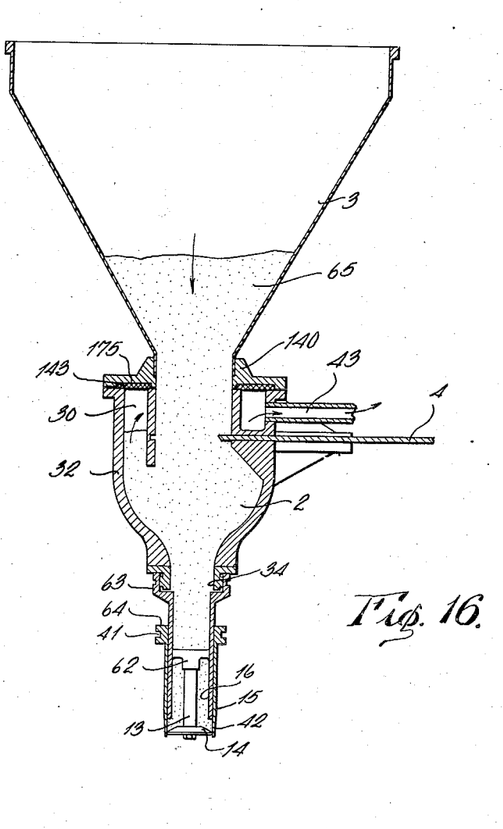
Figs. 16 and 17 are comparative diagrams showing the operation of the extrusion machine during the vacuum and pressure stages respectively of the operating cycle.

Cams 19 and 7, and disc 21 and its pin 22, are so mounted on main drive shaft 9 as to synchronize the timing of valve 4, cutter sleeve 15, and trip valve 25. Thus at the commencement of the suction or feeding stroke, bevelled edge 42 of cutter sleeve 15 is closed over disc 14, and while the cutter sleeve remains in this position trip valve 25 is moved into position to connect pipe line 43 via vacuum pipe line 53 with the inlet or suction side of pump 44 to draw compressed air from air jacket 30; valve 4 is now opened thus permitting some of the dough 65 to flow from the hopper 3 into dough chamber 2 (see Fig. 16), whereupon valve 4 closes again and cuts off all communication between hopper 3 and dough chamber 2. At the commencement of the compression or extrusion stroke (Fig. 17), trip valve 25 moves into position to connect pipe line 43 via compressed air line 52 and pressure chamber 49 with the delivery or compression side of the pump to rapidly build up pressure in air jacket 30 thus uniformly subjecting the dough in chamber 2 to the pressure in the air jacket, whereupon cutter sleeve 15 moves axially upward to open the extrusion outlet between nozzle 16 and disc 14, thus permitting a quantity of dough or other plastic material 66 to be forced through the extrusion outlet over the disc 14; thereupon cutter sleeve 15 moves downwards to close the extrusion outlet and sever the annular formation of extruded plastic from the disc 14.

The pressure in vacuum pipe line 53 may be regulated by means of hand valve 45 which opens or closes a connection with a perforated intake 51; similarly the number of pounds pressure in compressed air line 52 may be regulated by a pressure regulating valve 48, which may be adjusted, by means of set screw 46 and lock nut 55, to relieve pressure in compressed air line 52 whenever said pressure exceeds the amount so selected. The degree of vacuum registered upon compound vacuum and pressure gauge indicator 47 may be regulated, according to the viscosity and amount of plastic to be fed into dough chamber 2, by manipulating hand valve 45; and the amount of plastic extruded through the extrusion nozzles 16 may be regulated within very critical limits by adjusting pressure regulating valve 48. A pressure tank 49 may be connected between the delivery side of the pump and the trip valve 25 so as to maintain a substantially constant pressure in compressed air line 52 of the system thus assuring smoother operation and uniformity of size of the extruded plastic.

While for purposes of illustration extrusion nozzles 16 arranged in tandem are shown, the apparatus may be provided with one or more extrusion nozzles dependent upon the capacity required. Lower casing 32 may be provided with bolt holes 57 to clamp the apparatus to the brackets 5 by means of screw bolts 58. Drive shaft 9 may be driven in any preferred manner as by a drive sprocket 55 driven by a chain 61.

Figure 5:
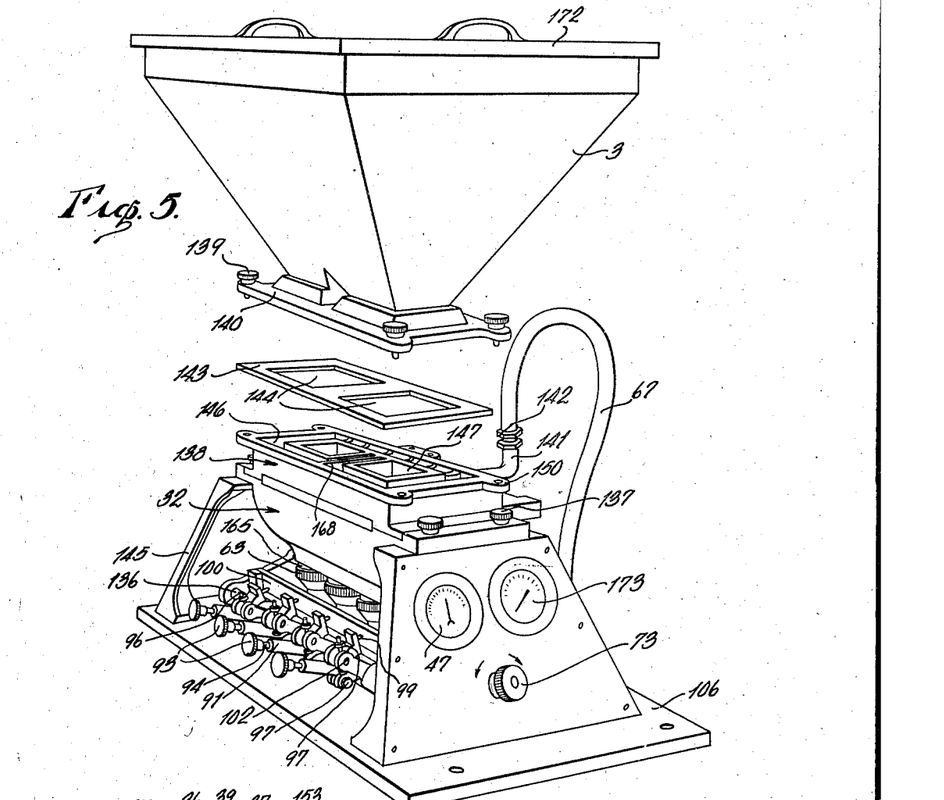
Fig. 5 is an exploded view of a commercial form of self contained multiple unit extrusion machine.
Figure 9:
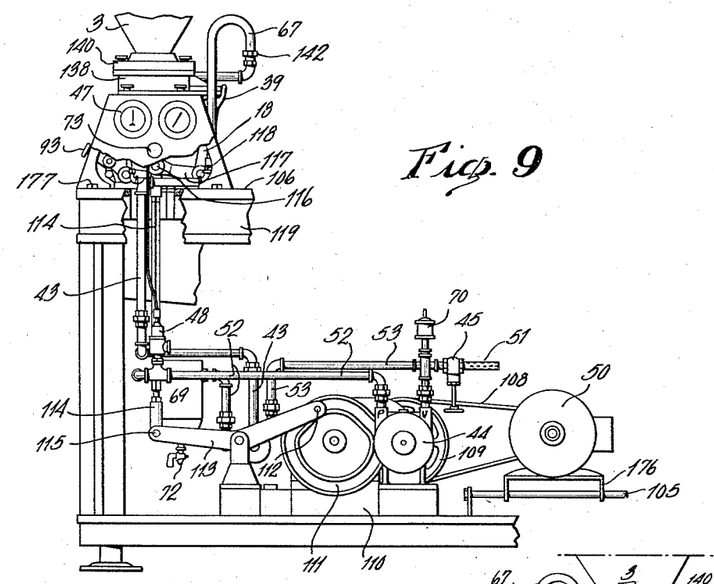
Fig. 9 is a view of one side of the extrusion machine and the power unit assembled in operating position upon an automatic doughnut machine.
Figure 10:
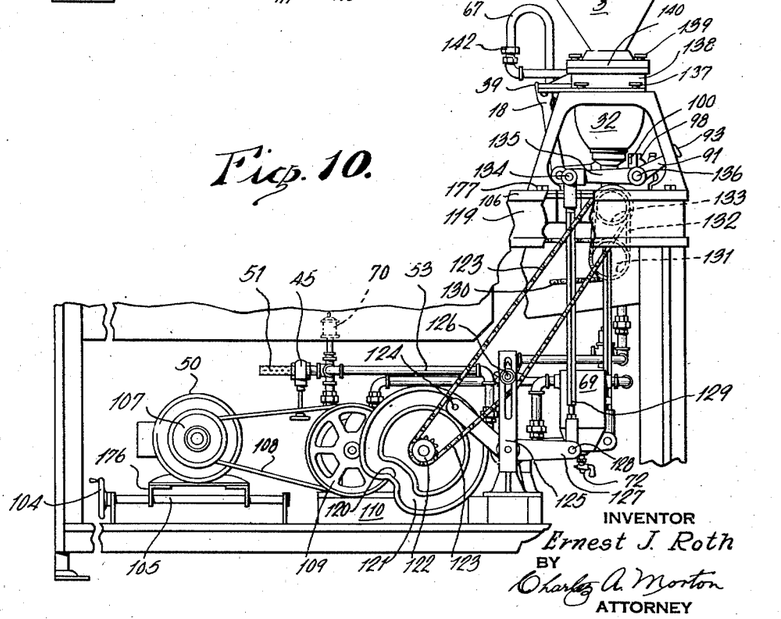
Fig. 10 is a view of the opposite side of the apparatus assembly of Fig. 9.
Figure 11:
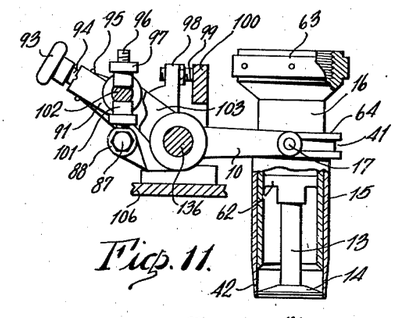
Figs. 11 to 14 inclusive are side views, some partly in section, of a sleeve cutting die and clutch mechanism therefor in four different positions.
Figure 12:
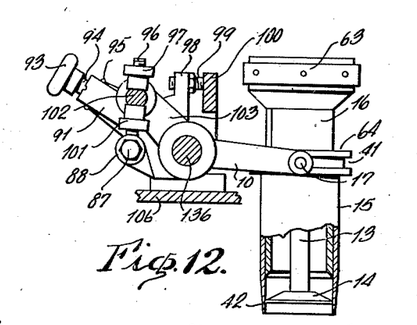

One suitable form of commercial machine, embodying the invention as applied to the frying kettle 119 of an automatic doughnut machine, is shown in Fig. 5 et seq. When thus used the feed unit (Fig. 5) or mechanism for extruding the plastic dough, is positioned above the frying kettle; and the control unit (Fig. 7) for timing and controlling the operation of the feed unit, together with the power unit which drives the control unit, are positioned beneath the frying kettle; thus producing a convenient assembly of the apparatus, substantially as shown in Figs. 9 and 10, where only a fragment of the frying kettle 119, sufficient to explain the general assembly, is illustrated.

Figures 7, 8:
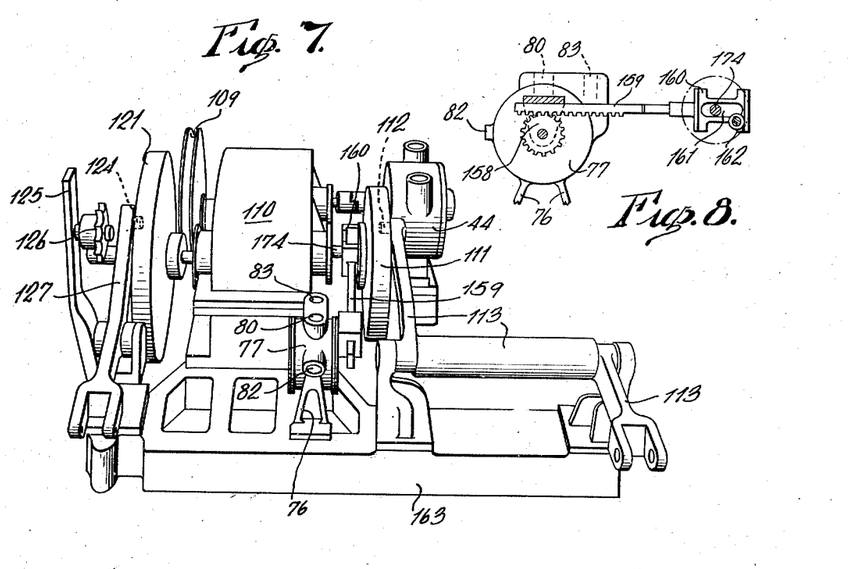
Fig. 7 is a perspective view of a convenient form of self-contained control unit used to drive the extrusion machine of Fig. 5.
Fig. 8 is a side view of the alternating valve mechanism of the power unit.

The dough hopper 3, dough chamber 2, slide valve 4, forming and cutting die 14—15—16, and the clutch mechanism for the die, are all mounted upon a base plate 106 (Fig. 5), to form a complete feed unit. The base plate 106 is adapted for ready attachment to the top of a frying kettle 119 (Figs. 9 and 10). Pump 44, trip valve 25, and necessary piping systems, and the cams for controlling the operation of slide valve 4 and cutter sleeve 15 in proper sequence (Fig. 7) are mounted upon a base plate 163 adapted for ready attachment to the supporting frame of the frying kettle 119. When the feed unit and the control unit are mounted in proper position, the necessary connecting rods for linking slide valve 4 and cutter sleeve 15 of the feed unit to their respective control cams of the control unit, and the necessary connections between the feed and control units, for establishing the vacuum-pressure system, are quickly installed, and the apparatus thus assembled is ready for service. Fig. 5 is an exploded view of the feed unit; Fig. 7 is a perspective view of the controlling unit; and Figs. 9 and 10 show the feed unit and control unit assembled upon a doughnut frying kettle, and coupled to a source of power (in this instance an electric motor) ready for service.

Figure 6:
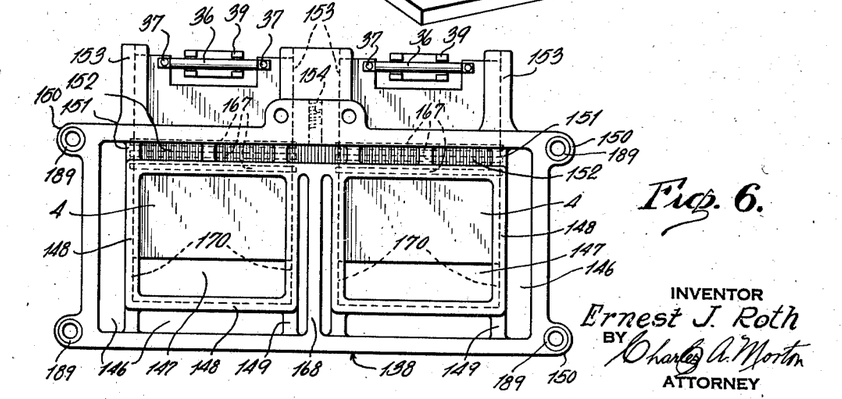
Fig. 6 is a top plan view of the dough chamber of the multiple unit machine of Fig. 5.

The feed unit (Figs. 5, 6 and 18) which is shown equipped with four forming and cutting dies, may include a hopper 3 sub-divided at the lower end into two sections having separate outlets. Hopper 3 may be provided with a suitable cover 172. The hopper outlets are welded in openings formed in a base plate 140. Plate 140 is securely fastened upon the upper face of the casting 138 forming the upper dough and air chamber, by means of a series of knurled bolts 139 which screw into the upper threaded holed ears 158 of casting 138. A gasket 143 having openings 144 adapted to register with the openings in plate 140 and with the partition walls 148 of the inner chambers 147—147 of casting 138, is clamped between plate 140 and the upper face of casting 138 to provide an air-tight fit. Casting 138 may be sub-divided by partition wall 168 into two distinct sub-units, and the partition walls 148 further separate the interior of casting 138 into the outer chambers 146—146 defining the air jackets and the inner chambers 147—147 defining the dough chambers. The outer wall of casting 138 and the partition walls 148 are connected together by a series of vertical webs 149, and a second series of vertical webs 151, and the horizontal webs 152 which are also designed to function as baffle plates to prevent the dough (or other plastic) from being sucked into the pipe line during that portion of the cycle when the trip valve 71 connects the air jackets 146 with the vacuum or intake side of pump 44. The vertical webs 151 are not flush with the upper face of casting 138, but end approximately one quarter of an inch or so below the face of the casting, thus defining a series of passages formed between the webs 151 and the lower face of gasket 144, each of said passages being substantially equal in cross sectional area to the area of a cross section of the bore of the nipple 141 to which the flexible air hose 67 is connected. The series of passages thus formed connect the air port 154 with the air chambers 146—146. The pockets formed between the vertical webs 151 by the horizontal webs 152 tend to augment the baffle action of the webs 151. Each sub-unit of casting 138 is equipped with a slide valve 4, which slides in guide slots 170 formed in the lower end of the partition walls 148—148 and in the external flanges 153—153 (Fig. 6). Each sliding blade is provided with an actuating pin 36 secured to the rear end of the blade by machine screws 37—37 as previously described. The actuating pin 36 is cradled between the bifurcated fingers 39—39 of the bifurcated lever 18 which is mounted upon a shaft 118 (Fig. 9) which is in turn journalled in bearings mounted upon base plate 106 of the feed unit.

Figure 18:
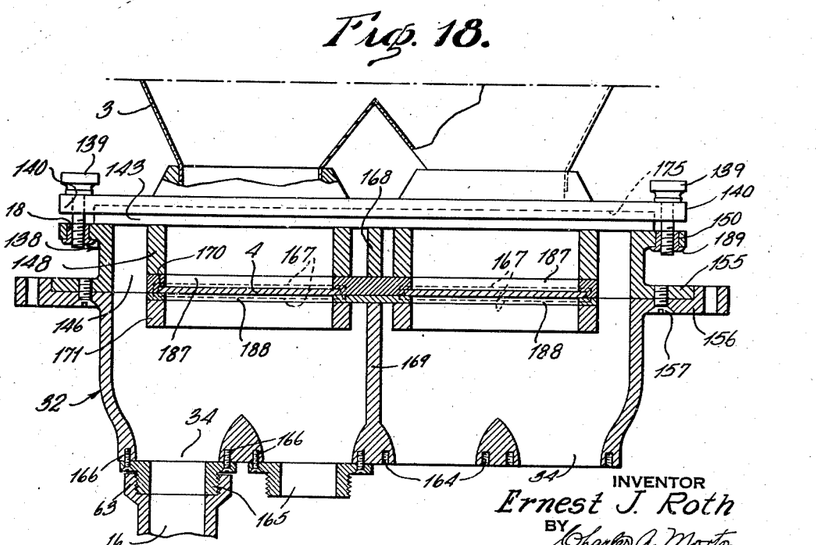
Fig. 18 is a vertical cross section of Fig. 6 with the hopper, hopper base plate, and gasket in place.
Figure 19:
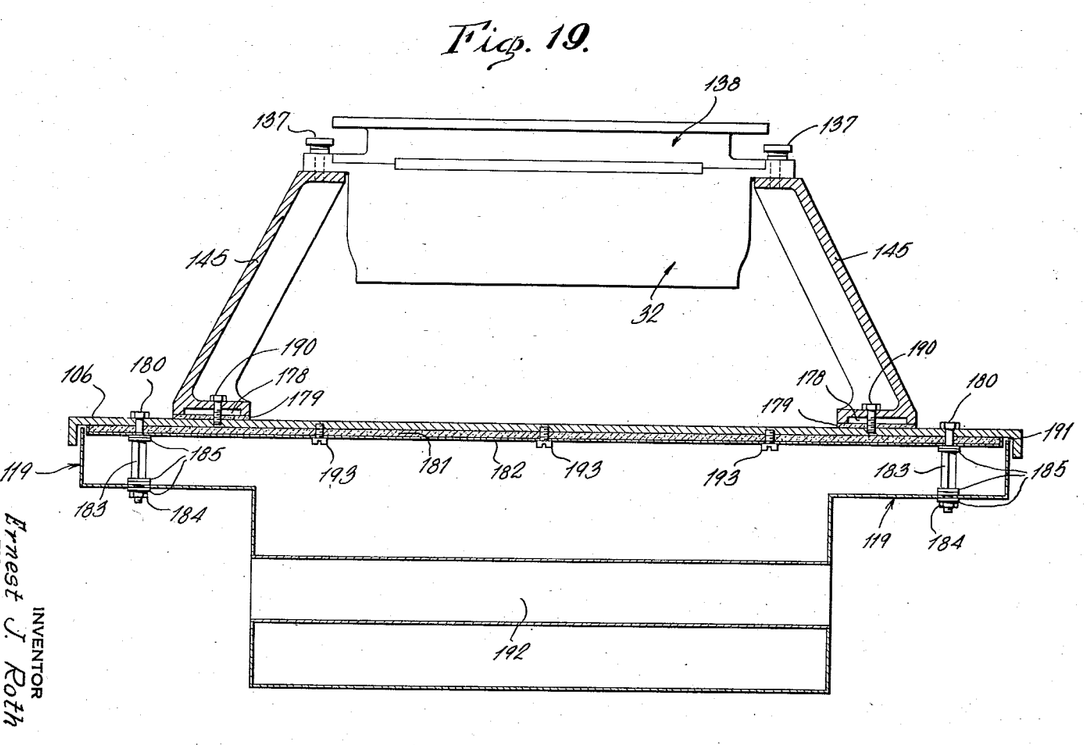
Fig. 19 is a detailed cross sectional view of the feed unit base plate and supporting bracket.

Casting 138 is designed to register with lower casting 32 (Fig. 18). Lower casting 32 is sub-divided into two sub-units by a central transverse partition wall 169. Casting 138 is provided with laterally projecting flanges 155 which register with laterally projecting flanges 156 of lower casting 32, and the two castings are clamped together to form an air tight connection by means of a series of machine screws 157. The guideways provide sufficient clearance to permit the slide valves 4—4 to slide freely in said guideways, and to prevent any leakage of air over said slide valves by way of said guide-ways, the lower face of upper casting 138 and the upper face of lower casting 32 are provided with a series of spaced grooves 167—167. As the slide valves 4 move outwards the film of dough (or other plastic) adhering to the upper and lower surfaces of the valves is transferred to the grooves 167—167 where the plastic is trapped and thereafter forms an air tight seal between the upper and lower faces of the sliding valves and the adjacent faces of the guide-ways. The dough thus trapped in the grooves 167 also serves to lubricate the faces of the slide valves. The flanges 156 are drilled to receive the knurled bolts 137 which screw into the upper face of the supporting brackets 145—145 (Fig. 5) of the feed unit. The brackets 145—145 are in turn bolted to base plate 106.

The lower end of casting 32 (Fig. 18) is provided with a series of extrusion outlets 34—34.

and the lower face of casting 32 is drilled and tapped at 164—164 to receive machine screws 166 for attaching the individual male threaded bushings 165 to each of the extrusion outlets 34. The female threaded flared collar 63 of the extrusion nozzle 16 is attached to the male thread of bushing 165 (Fig. 18). Thus each extrusion outlet 34 is provided with an independently detachable extrusion nozzle 16.

The casting of each extrusion nozzle 16 may include a spider 62 threaded to receive the stem 13 for the bevelled forming disc 14. The shoulder 64 of cutting sleeve 15 has an annular channel wherein the lifting pins 17—17 of fork 10 (Figs. 11 to 14) normally engage to control the telescopic action of cutter sleeve 15 on extrusion nozzle 16. All of the forks 10 are freely pivotally mounted upon one common clutch shaft 136 (Fig. 5). Each fork 10 is provided with a separate clutch (Fig. 5) so that the operation of each cutting and forming die can be independently controlled to selectively operate any or all of the forming and cutting dies as the operator may desire.

Each clutch (Figs. 13 and 14) consists of two distinct elements namely: a clutch 98, and a clutch pin 94. The forks 10, and their respective clutches 98 and clutch pins 94, are all mounted upon one common rocking shaft 136 (Figs. 5 and 13), the hubs of the housings 91 of the clutch pins 94 being keyed to the shaft 136, while each clutch 98 and its associated fork 10 is freely pivotally mounted upon shaft 136, with an adjustable connection between fork 10 and its clutch 98 to permit adjustment of cutting sleeve 15 relative to forming disc 14.

Figures 13, 14, 15:
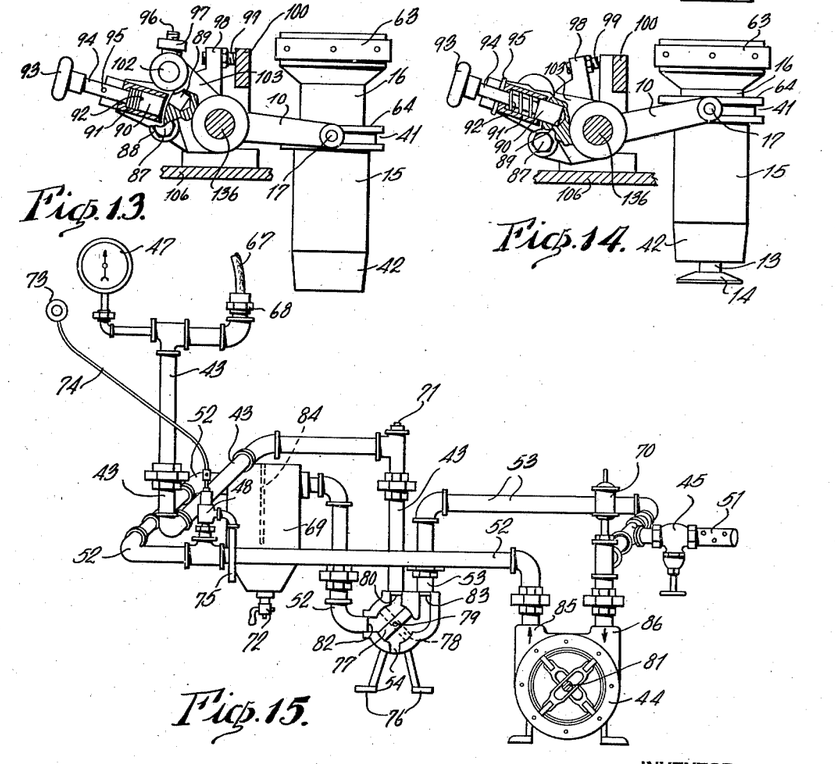
Fig. 15 is a diagrammatic view of a vacuum pressure pump and piping system of the power unit.

Referring to Figs. 13 and 14, clutch pin 94 is slidably mounted in housing 91 which is a hollow cylinder. A coiled spring 92 is mounted upon pin 94 between the head 90 of said pin and the shoulder of the housing 91. A locking pin 95 (Fig. 11) slides in a slot in the housing, but by pulling knob 93 outwards until locking pin 95 of clutch pin 94 clears its slot, the knob 93 may be rotated until locking pin 95 engages the notches cut in the shoulder of housing 91 (Fig. 13) to lock clutch pin 94 in its disengaged position. In its engaged position the head 90 of clutch pin 94 registers in a recess or socket 99 formed in clutch 98 (compare Figs. 13 and 14), and in this position (Fig. 14) clutch pin 94 and clutch 98 rock together upon common rocking shaft 136 to rock fork 10, thus raising and lowering the bevelled edge 42 of sleeve cutter 15 past the bevelled edge of the forming disc 14. Adjustable stop 99 engages a common stop bar 100 to limit the forward movement of clutch 98 when clutch pin 94 is disengaged therefrom (Fig. 13), whereby the movement of clutch 98, and therefore of fork 10, is arrested, and fork 10 is prevented from swinging about shaft 136 to an angle which would allow lifting pins 17—17 to disengage shoulder 64 of sleeve cutter 15, thus preventing the sleeve cutter from being released and falling into the frying kettle 119. A pivot bolt 87 passes through the ear 88 of a threaded adjusting pin 96 (Fig. 12) to secure the pin to clutch 98. Adjusting pin 96 also passes through an opening in a cross pin 102 which is journalled in a pair of spaced ears 103 formed in one end of fork 10, and by varying the position of the upper and lower adjusting nuts 97 and 101 upon the threads of adjusting pin 96, the size of the opening between the sleeve cutter 15 and forming disc 14 may be varied, and the extent of axial travel of sleeve cutter 15 may be regulated. As each clutch has individual adjustments, each cutting and forming die can be separately adjusted. To operate the extrusion machine at maximum capacity all of the clutch pins 94 are engaged in the recesses 99 of their respective clutches 98 (Fig. 14), while to reduce the delivery capacity of the machine one or more clutch pins 94 is disengaged (Fig. 13).

The operation of the extrusion machine unit (Fig. 5) is controlled by a control unit (Fig. 7) positioned beneath the frying kettle 119 (Figs. 9 and 10). The various elements of the control unit are mounted upon a common base 163 (Fig. 7) which in turn is bolted to the supporting frame of the frying kettle 119 (Figs. 9 and 10). The control elements mounted upon base 163 include a gear reduction box 110 driven via a V belt pulley 109. Pulley 109 of the gear reduction box is driven by an electric motor 50 via an adjustable pulley 107 and a V drive belt 108 (Fig. 10). Pressure pump 44 is coupled to one shaft of reduction box 110, and box cams 111 and 121 are driven by pulley 109 via a reducing gear train (not shown) in the gear reduction box 110. Cam follower 112 (Figs. 7 and 9) mounted on one end of bell crank lever 113 follows box cam 111 to rock shaft 118, thus controlling the back and forth motion of slide valves 4—4; while cam follower 124 (Figs. 7 and 10) mounted on one end of bell crank lever 127, follows box cam 121 to rock shaft 136, thus controlling the telescopic action of the sleeve cutters 15—15. In the position of cam follower 112 as shown in Fig. 9, the slide valve 4—4 would be partially open (Fig. 6) by way of bell crank lever 113, crank pin 115, connecting rod 114, lever pin 116, common rocking shack 118, levers 19—19, and actuating pins 38 of slide valves 4.

In the position of cam follower 124 shown in Fig. 10, the sleeve cutters 15—15 would be closed (Fig. 12) by way of bell crank lever 127, crank pin 128, connecting rod 129, lever pin 134, lever arm 135, common rocking shaft 136, clutch pin 94, clutch 98, fork 10, lifting pins 17—17, and sleeve cutters 15—15. When by the rotation of box cam 121, cam follower 124 enters the flat V shaped portion 126 of the box cam, bell crank lever 127 rocks to control the up and down telescopic action of the sleeve cutters 15—15.

Shaft 81 (Fig. 15) of pump 44 is connected to the main shaft of reduction box 110, to cause pump 44 to deliver to compressed air through its delivery port 85 to compressed air line 52, and to create a partial vacuum at its intake port 86 and in vacuum pipe line 53 connected thereto. Oil for pump 44 is supplied from a drip oil cup 70. The degree of vacuum can be regulated by hand valve 45 through an open ended perforated nipple 51. Nipple 51 is left open so that if the perforations are accidentally covered up, the open end of nipple 51 will still connect valve 45 with atmosphere, and the nipples are perforated so that if their open ends are accidentally plugged the perforations will still admit air to valve 45. Baffle plate 84 of oil trap 69 prevents any drops of oil carried into compressed air pipe 52 from reaching either alternating valve 77, or vacuum and pressure line 43, or the air chamber 146, or the dough chamber 147, of feed unit (Fig. 5). Pet cock 72 is used for periodically draining trapped oil from oil trap 69. The pressure of the compressed air is regulated through exhaust port 75 by a valve 48 which is controlled by a regulating knob 73 mounted in the feed unit (Figs. 5 and 15) through flexible cable 74. The pressures of the compressed air and of the vacuum, to which vacuum-pressure pipe 43 is alternately subjected, are respectively visibly indicated on a combined vacuum-pressure gauge 47 (Figs. 5 and 15). The temperature of the cooking fluid in frying kettle 119, is indicated on the dial 173 (Fig. 5) of a thermometer.

Alternating (trip) valve 77 for alternately connecting the intake or vacuum side 86, and then the delivery or compressed air side 85, of pump 44, to the chamber 146 (Figs. 6 and 18), has feet 76 which are bolted to base plate 163. Valve 77 is rocked by a rack 159 (Fig. 7) and pinion 158 (Fig. 8), the latter being mounted on the valve shaft 79 (Fig. 15). Rack 159 is reciprocated by valve shifter 160 which is rocked to and fro by a roller cam 162 (Fig. 8) mounted upon the rear side of control unit 111. Shaft 174 which drives cam 111 passes through an elongated opening 161 (Fig. 8) formed in valve shifter 160.

A source of power, such as an electric motor 50, is mounted beneath the frying kettle 119 upon a suitable adjustable base 176, whose adjustment is controlled by a worm screw 105 operated by a handle 104 to vary the distances between motor 50 and pulley 109. As this distance is varied, adjustable pulley 107 functions to vary the position of the V shaped drive belt 108 in pulley 107, thus varying the speed of the pulley 109 of gear reduction box 110. The travelling conveyor 130 of frying kettle 119 is driven from drive sprocket 122 by way of endless chain 123, which drives upper sprocket 133, which in turn drives the endless chain 132 to drive sprocket 131 which controls the operation of conveyor 130. An idler sprocket 126, is adjustably mounted in a bracket 125 bolted to the base 163 of the control unit, to take up any slack in endless chain 123. The movement of the travelling conveyor 130 should be synchronized with the movement of sleeve cutter 15 so that the annular extrusions of plastic material or ring doughnuts will be severed by the sleeve cutters 15—15 at the moment when a compartment of travelling conveyor 130 is properly located beneath the forming and cutting dies.

The various elements of the control unit are preferably assembled upon base 163 in properly timed relation, and the pipes and pipe connections between pump 44, valves 77, 45, 48, and oil trap 69, may all be made in advance, so that an extrusion machine having all of its parts assembled and correctly synchronized can be quickly installed and put into service by: bolting the base plate 106 of a previously assembled and synchronized feed unit to the top of frying kettle 119; bolting base plate 163 of a previously assembled and synchronized control unit to the framework beneath the frying kettle; coupling up drive belt 108 to a suitable source of power, and endless chain 123 to the conveyor drive of the frying kettle; interconnecting hopper nipple 141 (Fig. 5), and vacuum-pressure pipe 43 (Fig. 15); adjustably attaching connecting rod 114 between bell crank lever 113 of the control unit and lever arm 117 of the feed unit to control slide valves 4—4 of the feed unit; and adjustably attaching connecting rod 129 between bell crank lever 127 of the control unit and lever arm 135 of the feed unit to control the sleeve cutters 15—15 by way of the rocking shaft 136, the clutches 94—98, and the sleeve forks 10—10.

As the feed units, and the control units, are standard assemblies, they are both interchangeable with other units of their respective types forming a part of any automatic cooking machine assembly, so that an assembly which develops a defect in either the feed unit, or in the control unit, requiring shop service, can be immediately removed and replaced with another feed unit or control unit as the case may be, and the automatic cooking machine immediately restored to service. By throwing out the associated clutch pin 94, any forming and cutting die element can be shut down, and adjusted without stopping the entire machine.

The lower face of the hopper base plate 146 is recessed at 175 to receive the gasket 143. Gasket 143 may be made of any suitable resilient material, but experience shows that a gasket made of neoprene gives very satisfactory results. The thickness of the gasket is such that when the gasket connection is completely airtight the lower face of the hopper base plate 146 will still be separated from the upper face of the upper dough chamber 138. Gasket 143 is permanently cemented in recess 175 with a suitable cement.

The guide slots 170 in which the slide valves 4—4 operate are formed in two oppositely disposed bronze inserts 187 and 188 (Fig. 18) embedded respectively in the lower face of the upper casting 138 and the upper face of the lower casting 32. By using bronze inserts to form the guide slots 170 the wear and tear which would otherwise occur due to the friction of the slide valves 4—4 on the softer metal of the castings 138 and 32 is eliminated. The bronze inserts 187 and 188 are inserted in the mold before the metal casting is poured so that when the casting is completed the inserts are embedded in the cast metal and form an integral part of the casting. The bronze insert and the softer metal of the casting are then machined in one single operation, thus saving time and labor and reducing the manufacturing costs.

Threaded bronze bushings 189 are press fitted in the holed ears 150 of upper casting 138. The lower end of each bronze bushing terminates in an annular flange which engages the surface of the holed ear 150 thereby preventing the bushing 189 from being loosened or pulled out when the knurled bolts 139 are tightened in place.

Some plastic materials such as dough batter give better results when kept as cool as possible. In the present invention the inner dough chamber 147 is substantially surrounded on all sides by the outer air chamber 146, and the rapid circulation of the air in air chamber 146 due to the constant action of pump 44 and alternating valve 77, tends to keep the walls of the dough chamber 147 cool at all times. Furthermore it is desirable to insulate the feed unit as far as possible against heat by conduction. For that reason the underside of the base plate 106 of the feed unit is shielded with an asbestos plate 181 to insulate base plate 106 from the heated air and gases rising from the frying kettle 119. A sheet metal cover 182 protects the asbestos plate 181 from injury, and metal cover 182 is secured to the underside of base plate 106 by a series of machine screws 193. To insulate base plate 106 against the transmission of heat by conduction, base plate 106 is attached to kettle 119 by means of suitable machine bolts 180 and lock nuts 184, the bolts 180 being insulated from the sheet metal cover 182 of base plate 106 and from the frying kettle 119 by means of a series of fibre bushings or fibre washers 185—185. Metal bushing 183 surrounding the shank of bolt 180 serves to keep the fibre bushings 185 in proper position. To further augment the insulating effect the flanges 194 of base plate 106 is spaced away from the top edge of the side wall of frying kettle 119 so as to leave an air space 191 between flange 194 and the edge of the kettle. The feet of the brackets 145 which support the feed unit are undercut to provide an air space 178 between a major portion of the base of each bracket 145 and the surface of base plate 106, and the base of each bracket 145 is permanently insulated from the surface of base plate 106 by means of a fibre pad 179. Suitable machine screws 190 anchor the brackets 145 to base plate 106.

Principle of Operation

Suction or feed stroke

Plastic material 65 such as dough batter is put into hopper 3, and valve 4 opens (Fig. 16) to form a continuous passage between hopper 3 and dough chamber 2 completing one branch of a pressure system which branch is subjected to atmospheric pressure above the head of dough in open hopper 3, while air jacket 30 and pipe line 43 constitute the other branch of a pressure system which branch is connected via trip valve 25 (Fig. 2) and vacuum line 53 to the intake or suction side of pump 44, so that air jacket 30 is immediately subjected to a pressure below atmosphere by the action of pump 44, hence due to the difference in pressure between the open hopper 3 and the exhausted air jacket 30, plastic material flows downwards from hopper 3 into dough chamber 2 thence upwards into air jacket 30. At the same time trip valve 25 (Fig. 2) connects compressed air line 52 to atmosphere via port 54. During this suction stroke the extrusion outlet formed between extrusion nozzle 16 and forming disc 14 is closed (Fig. 16) by annular die 15.

Compression or extrusion stroke

Valve 4 now closes and cuts off all communication between hopper 3 and dough chamber 2, whereupon trip valve 25 (Fig. 2) moves to position 25' to connect pipe line 43 with compressed air line 52 and the delivery or compression side of pump 44, thereby rapidly building up pressure in air jacket 30 to a point substantially above atmosphere, and thereafter sleeve cutter 15 moves upwards to uncover the extrusion outlet of extrusion nozzle 16 (Fig. 17) thus allowing a quantity of plastic 66 to be forced through nozzle 16 and over disc 14 to form a ring of plastic material; at the same time with the trip valve in the position 25', vacuum line 53 is connected to exhaust 54 to atmosphere. Cutter sleeve 15 now moves downwards until its bevelled edge 42 passes the bevelled peripheral edge of disc 14 and severs the ring of extruded plastic, and the cycle of operations is repeated.

Whenever handle 104 is turned to operate worm screw 105 and move motor 50 towards or away from V belt pulley 109 to vary the speed of gear reduction box 110 thereby changing the speed of box cams 111 and 121, the speed of vacuum-pressure pump 44 which is coupled to the same shaft of the gear reduction box as pulley 109, varies in like proportion, so that whenever the operating speed of box cams 111 and 121 is either increased or decreased the corresponding increase or decrease in the speed of vacuum-pressure pump 44 results in a proportionate increase or decrease in the capacity of pump 44.

What is claimed is:

1. In an extrusion machine and in combination, a chamber for housing plastic material, said chamber having a valved inlet through which plastic may be admitted into, and a valved outlet through which plastic may be extruded out of, said chamber, a pump, valve mechanism for interconnecting said chamber and said pump, said valve mechanism being operable to intermittently connect said chamber first with the intake side of the pump when the inlet valve is open and the outlet valve is closed to rapidly decrease the pressure within said chamber below atmosphere to effect entry of plastic into the chamber, and then with the delivery side of the pump when the inlet valve is closed to rapidly increase the pressure within said chamber substantially above atmosphere before the outlet valve opens to allow plastic to be extruded through said extrusion outlet, and means for opening and closing said inlet and outlet valves and for operating said valve mechanism in properly timed sequence.

2. In an extrusion machine and in combination, a chamber for housing plastic material, said chamber having a valve controlled inlet through which plastic may be admitted into, and a valve controlled outlet through which plastic may be extruded out of, said chamber, a pump, valve mechanism for interconnecting said chamber and said pump, said valve mechanism being operable to intermittently connect said chamber first with the intake side of the pump when the inlet valve is open and the outlet valve is closed to rapidly decrease the pressure within said chamber below atmosphere to effect entry of plastic into the chamber, and then with the delivery side of the pump when the inlet valve is closed to rapidly increase the pressure within said chamber substantially above atmosphere before the outlet valve opens to allow plastic to be extruded through said extrusion outlet, means for manually regulating the pressure within said chamber to control the amount of plastic intermittently extruded through said extrusion outlet, and means for opening and closing said inlet and outlet valves and for operating said valve mechanism in properly timed sequence.

3. In an extrusion machine and in combination, a chamber for housing plastic material, said chamber having a valve controlled inlet through which plastic may be admitted into, and a valve controlled outlet through which plastic may be extruded out of, said chamber, a pump, valve mechanism for interconnecting said chamber and said pump, said valve mechanism being operable to intermittently connect said chamber first with the intake side of the pump when the inlet valve is open and the outlet valve is closed to rapidly decrease the pressure within said chamber below atmosphere to effect entry of plastic into the chamber, and then with the delivery side of the pump when the inlet valve is closed to rapidly increase the pressure within said chamber substantially above atmosphere before the outlet valve opens to allow plastic to be extruded through said extrusion outlet, means for separately regulating the pressure on the intake and on the delivery sides of the pump, and means for opening and closing said inlet and outlet valves and for operating said valve mechanism in properly timed sequence.

4. In an extrusion machine and in combination a chamber for housing plastic material, a valve controlled inlet a valve controlled outlet and an air pipe connection for said chamber; a pneumatic system provided with a vacuum pressure branch and a compressed air branch; a two-way valve connected to said air pipe and operable to intermittently connect said chamber via said air pipe with each of the branches of said pneumatic system in succession to alternately first quickly reduce the pressure within said chamber below atmosphere while the inlet valve is open and the outlet valve is closed to effect entry of plastic into said chamber and then quickly increase the pressure within said chamber substantially above atmosphere after the inlet valve is closed and before the outlet valve is opened to allow plastic to be extruded through said outlet valve, and means for controlling the opening and closing of said inlet and outlet valves and the operation of said two-way valve in properly timed sequence.

5. In an extrusion machine and in combination a chamber for housing plastic material, said chamber being provided with an inlet valve connection, an outlet valve connection, and an air pipe connection; a vacuum pressure source, a compressed air source, a two-way valve connected to said air pipe and operable to intermittently connect said chamber via said air pipe with each of said sources in succession to first quickly reduce the pressure within said chamber below atmosphere while the inlet valve is open and the outlet valve is closed thus admitting plastic into said chamber, and then quickly increase the pressure within said chamber substantially above atmosphere after closing the inlet valve but before opening the outlet valve to allow plastic to be extruded through said outlet valve, and means for controlling the opening and closing of said inlet and outlet valves and the operation of said two-way valve in properly timed sequence.

6. An extrusion machine comprising a chamber for housing plastic material, said chamber having an inlet port and an outlet port, an inlet valve for opening and closing said inlet port to control the admission of plastic into said chamber, an outlet valve for opening and closing said outlet port to control the extrusion of plastic from said chamber, an air pipe connecting with said chamber, a two-way valve having its common outlet connected to said air pipe, the separate branches of said two-way valve being adapted to be connected to the vacuum pressure and compressed air sides respectively of a pnuematic system of sufficient capacity to rapidly change the pressure in said chamber from substantially below to substantially above atmosphere, and a cam shaft for operating each of said valves in properly timed sequence so as to open the inlet valve and move the two-way valve into position to quickly exhaust air from the chamber while the outlet valve is held closed thereby rapidly filling the chamber with plastic, and then to close the inlet valve move the two-way valve into position to quickly fill the chamber with compressed air and open the outlet valve to allow plastic to be extruded from the chamber.

7. An extrusion machine comprising a receiving chamber for plastic material, said chamber having an inlet port and an outlet port, an inlet valve for opening and closing said inlet port to control the admission of plastic into said chamber, an outlet valve for opening and closing said outlet port to control the extrusion of plastic from said chamber, an air pipe connecting with said chamber, a two-way valve having its common outlet connected to said air pipe, the separate branches of said two-way valve being adapted for connection to the positive and negative pressure branches respectively of a pneumatic system of sufficient capacity to rapidly exhaust air from the chamber while the inlet valve is open and the outlet valve remains closed to admit plastic into the chamber, and then quickly fill the chamber with compressed air with the inlet valve closed before the outlet valve is opened to allow plastic to be extruded from the chamber, means for controlling the movement of each of said valves in properly timed sequence, and means for independently regulating the pressure in each branch of the pneumatic system.

8. In an extrusion machine and in combination: a feed unit comprising, a chamber for housing plastic material, a valved inlet through which plastic may be admitted into said chamber, a valved outlet through which plastic may be extruded from said chamber; a control unit separate and distinct from the feed unit, said control unit comprising, cam mechanism, a vacuum-pressure pump, an alternating valve connected to said pump, said cam mechanism and alternating valve being respectively adapted to be mechanically and pneumatically connected to the inlet and outlet valves, and to the chamber, of the feed unit, to operate in properly timed relation to open and close said inlet and outlet valves and to increase and decrease the pressure in said chamber in predetermined cyclic order to control the periodic admission of plastic into the feed unit chamber, the periodic extrusion of plastic formations from the feed unit chamber, and the periodic severance of the plastic extrusions thus formed; means for mechanically connecting the cam mechanism of the control unit with the valve mechanism of the feed unit; means for pneumatically connecting the alternating valve of the control unit with the feed unit chamber; and means for operating the pump, the alternating valve, and the cam mechanism.

9. In an extrusion machine and in combination: a feed unit comprising, a chamber for housing plastic material, a valved inlet through which plastic may be admitted into said chamber, a valved outlet including a forming and cutting die through which plastic may be extruded from said chamber and formed and severed by said die; a control unit comprising, cam mechanism, an air pump, an alternating valve, pipe connections between the opposite sides of said air pump and said alternating valve, said cam mechanism and said alternating valve being respectively adapted to be mechanically and pneumatically coupled to the inlet and outlet valves and to the chamber of the feed unit and to operate in properly timed relation to open and close said inlet and outlet valves and to decrease and increase the air pressure in said chamber in predetermined cyclic order to control the periodic admission of plastic into the feed unit chamber, the periodic extrusion of plastic formations from the feed unit chamber, and the periodic severance of the plastic extrusions thus formed; connecting rods for coupling the cam mechanism of the control unit with the valve mechanism of the feed unit; a flexible hose for pneumatically coupling the alternating valve of the control unit with the feed unit chamber; and a common source of power for driving the air pump, the alternating valve and the cam mechanism.

10. In an extrusion machine and in combination: a feed unit comprising, a chamber for housing plastic material, a valved inlet through which plastic may be admitted into said chamber, a valved outlet through which plastic may be extruded from said chamber; a control unit comprising, a vacuum-pressure pump, a speed reducer coupled to said pump, cam mechanism and an alternating valve operated by said speed-reducer, pipe connections between said alternating valve and the vacuum-inlet and pressure-outlet of said pump, said cam mechanism and said alternating valve being respectively adapted to be mechanically and pneumatically coupled to the valves and chamber of the feed unit and to operate in properly timed sequence to open and close the valves of the feed unit and to vary the air pressure in the chamber below and above atmosphere in predetermined cyclic order to control the periodic admission of plastic into, and the periodic extrusion of measured units of plastic from, the chamber; means for mechanically coupling the cam mechanism of the control unit with the valve mechanism of the feed unit, and means for pneumatically coupling the alternating valve of the control unit with the feed unit chamber.

11. In an extrusion machine and in combination: a feed unit comprising a chamber for housing plastic material, a valved inlet through which plastic may be admitted into said chamber, a plurality of selectively operable valved outlets through which plastic may be extruded from said chamber; a control unit comprising, a vacuum-pressure pump, a speed-reducer coupled to said pump, cam mechanism, and an alternating valve, operated by said speed-reducer, pipe connections between said alternating valve and the vacuum-inlet and pressure-outlet of said pump, said cam mechanism and said alternating valve being respectively adapted, to be mechanically and pneumatically coupled to the valves and chamber of the feed unit, and to operate in properly timed sequence, to open and close the valves of the feed unit and to vary the air pressure in the chamber below and above atmosphere, in predetermined cyclic order, to control the periodic admission of plastic into, and the periodic extrusion of measured units of plastic from, the chamber; means for mechanically coupling the cam mechanism of the control unit with the valve mechanisms of the feed unit, and means for pneumatically coupling the alternating valve of the control unit with the feed unit chamber.

12. In an extrusion machine and in combination: a feed unit comprising, a chamber for housing plastic material, a valved inlet through which plastic may be admitted into said chamber, a plurality of valved outlets through which plastic may be extruded from said chamber, a shaft operable to actuate said valved outlets, clutch mechanism operable to selectively connect said valved outlets to, and disconnect said valved outlets from, said shaft; a control unit comprising, a plurality of cams, a pump, an alternating valve pneumatically coupled to the intake and delivery sides of said pump, one of said cams being adapted to be mechanically coupled to the feed unit inlet valve, another of said cams being adapted to be mechanically coupled to the actuating shaft of the valved outlets, said alternating valve being adapted to be pneumatically coupled to the feed unit chamber, said cams and alternating valve being synchronized to control, the opening and closing of the inlet valve and of any selected outlet valve, and the fluid pressure in the chamber, of the feed unit, in predetermined cyclic order, to control the periodic admission of plastic into the feed unit chamber, and the periodic extrusion of measured units of plastic from, the chamber; means for coupling the cams of the control unit to the inlet valve and to the said actuating shaft of the feed unit, and means for pneumatically coupling the alternating valve of the control unit to the feed unit chamber.

13. In an extrusion machine and in combination: a feed unit comprising, a chamber for housing plastic material, a plurality of valved inlets through which plastic may be admitted into said chamber, a shaft operable to actuate said valved inlets, a plurality of valved outlets through which plastic may be extruded from said chamber, a shaft operable to actuate said valved outlets, clutch mechanism operable to selectively connect said valved outlets to and disconnect said valved outlets from, said shaft; a control unit, comprising, a plurality of cam actuated bell crank levers, a pump, an alternating valve pneumatically coupled to the intake and delivery sides of said pump, one of said bell crank levers being adapted to be mechanically coupled to the actuating shaft of the valved inlets, another of said bell crank levers being adapted to be mechanically coupled to the actuating shaft of the valved outlets, said alternating valve being adapted to be pneumatically coupled to the feed unit chamber, said bell crank levers and alternating valve being synchronized to control, the opening and closing of the inlet valves and of any selected outlet valve, and the fluid pressure in the chamber, of the feed unit, in predetermined cyclic order, to control the periodic admission of plastic into the feed unit chamber, and the periodic extrusion of measured units of plastic from, said chamber; means for coupling the bell crank levers of the control unit to the valve actuating shafts of the feed unit, and means for pneumatically coupling the alternating valve of the control unit to the feed unit chamber.

14. In an extrusion machine an air jacket, an air port through which air may be admitted into and exhausted from said air jacket to vary the pressure therein above and below atmosphere, a chamber for housing plastic material positioned within said air jacket and defining an inner chamber cooled by the air entering and leaving said air jacket through said air port, the lower end of the inner chamber merging with the air jacket, a valved inlet through which plastic may be admitted into said chamber when the pressure in the air jacket is reduced below atmosphere, and a plate positioned in the air jacket so as to baffle the flow of plastic into the air port when the pressure in the air jacket falls below atmosphere.

15. In an extrusion machine and in combination, a chamber for housing plastic material, said chamber having a valve controlled inlet, a valve controlled outlet including a forming and cutting die through which plastic may be extruded from said chamber and formed and severed by said die, and an air port, a two-way valve having its common outlet connecting with said air port, the separate branches of said two-way valve being adapted for connection to the negative and positive pressure branches respectively of a pneumatic system of sufficient capacity to alternately reduce and then raise the pressure in said chamber below and above atmosphere, means for operating said two-way valve, and means for opening and closing the inlet valve when the chamber pressure is reduced and for opening and closing the outlet valve when the chamber pressure is raised.

16. In an extrusion machine an air jacket, an air port through which air may be admitted into and exhausted from said air jacket to vary the pressure therein above and below atmosphere, a chamber for housing plastic material positioned within said air jacket and cooled by the changing air, the lower end of the inner chamber merging with the air jacket, a valved inlet through which plastic may be admitted into said chamber when the pressure in the air jacket is reduced below atmosphere, and a valved outlet through which plastic may be extruded from the chamber when the pressure in the air jacket is raised above atmosphere.

17. In an extrusion machine an air jacket, an air port through which air may be admitted into and exhausted from said air jacket to vary the pressure therein above and below atmosphere, a chamber for housing plastic material positioned within said air jacket and cooled by the changing air, the lower end of the inner chamber merging with the air jacket, a valved inlet through which plastic may be admitted into said chamber when the pressure in the air jacket is reduced below atmosphere, a plate positioned in the air jacket so as to baffle the flow of plastic into the air port when the pressure in the air jacket falls below atmosphere, and a valved outlet through which plastic may be extruded from the chamber when the pressure in the air jacket is raised above atmosphere.

18. In an extrusion machine an air jacket, an air port through which air may be admitted into an exhausted from said air jacket to vary the pressure therein above and below atmosphere, a chamber for housing plastic material positioned within said air jacket and cooled by the changing air, the lower end of the inner chamber merging with the air jacket, a valved inlet through which plastic may be admitted into said chamber when the pressure in the air jacket is reduced below atmosphere, and a valved outlet including a forming and cutting die through which plastic may be extruded from the chamber when the pressure in the air jacket is raised above atmosphere to be formed and severed by said die.

19. In an extrusion machine an air jacket, an air port through which air may be admitted into and exhausted from said air jacket to vary the pressure therein above and below atmosphere, a chamber for housing plastic material positioned within said air jacket and cooled by the changing air, the lower end of the inner chamber merging with the air jacket, a valved inlet through which plastic may be admitted into said chamber when the pressure in the air jacket is reduced below atmosphere, a plate positioned in the air jacket so as to baffle the flow of plastic into the air port when the pressure in the air jacket falls below atmosphere, and a valved outlet including a forming and cutting die through which plastic may be extruded from the chamber when the pressure in the air jacket is raised above atmosphere and is formed and severed by said die.

20. In an extrusion machine and in combination: a feed unit comprising, an air jacket having an air port formed therein through which air may be admitted into and exhausted from said jacket to vary pressure therein above and below atmosphere, a chamber for housing plastic material positioned within said air jacket and cooled by the changing air, the lower end of the chamber merging with the air jacket, a valved inlet through which plastic may be admitted into said chamber when the pressure in the air jacket is reduced below atmosphere, a valved outlet including a forming and cutting die through which plastic may be extruded from said chamber and formed and severed by said die when the pressure in the air jacket is raised above atmosphere; a control unit separate and distinct from the feed unit, said control unit comprising, cam mechanism, a vacuum-pressure pump, an alternating valve connected to said pump, said cam mechanism and alternating valve being respectively adapted to be mechanically and pneumatically connected to the inlet and outlet valves, and to the air port, of the feed unit, to operate in properly timed relation to open and close said inlet and outlet valves and to vary the pressure in said air jacket in predetermined cyclic order; means for mechanically connecting the cam mechanism of the control unit with the valve mechanism of the feed unit; and means for pneumatically connecting the alternating valve of the control unit with the air port.

ERNEST J. ROTH.